United States Patent
Long

(10) Patent No.: US 9,602,268 B2
(45) Date of Patent: Mar. 21, 2017

(54) FULL-DUPLEX COMMUNICATION APPARATUS AND METHOD

(71) Applicant: HUAWEI TECHNOLOGIES CO., LTD., Shenzhen (CN)

(72) Inventor: Hao Long, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 14/260,912

(22) Filed: Apr. 24, 2014

(65) Prior Publication Data
US 2014/0233436 A1 Aug. 21, 2014

Related U.S. Application Data

(63) Continuation of application No. PCT/CN2011/081521, filed on Oct. 28, 2011.

(51) Int. Cl.
*H04B 7/005* (2006.01)
*H04L 5/14* (2006.01)
(Continued)

(52) U.S. Cl.
CPC .............. *H04L 5/14* (2013.01); *H04B 1/123* (2013.01); *H04B 1/525* (2013.01); *H04B 7/0617* (2013.01); *H04B 7/086* (2013.01)

(58) Field of Classification Search
USPC .......................... 370/252, 278, 328, 338, 401
See application file for complete search history.

(56) References Cited

U.S. PATENT DOCUMENTS 4,498,885 A 2/1985 Namiki
4,584,712 A 4/1986 Isobe et al.
(Continued)

FOREIGN PATENT DOCUMENTS

CN 1586023 2/2005
CN 101197798 6/2008
(Continued)

OTHER PUBLICATIONS

Chinese Office Action dated Jan. 6, 2015 in corresponding Chinese Patent Application No. 201180002495.6.
(Continued)

*Primary Examiner* — Ricky Ngo
*Assistant Examiner* — Christine Ng
(74) *Attorney, Agent, or Firm* — Staas & Halsey LLP

(57) ABSTRACT

An embodiment of the present invention discloses a full-duplex communication apparatus, including at least one transmit antenna and at least one signal synthesizing apparatus, where the signal synthesizing apparatus is connected to at least two receive antennas, the at least one transmit antenna is configured to transmit a first transmit signal, the at least two receive antennas are configured to separately receive the first transmit signal, and the signal synthesizing apparatus is configured to receive the first transmit signal from the at least two receive antennas, where a phase difference exists between the received first transmit signals, and synthesize the received first transmit signals, where strength of the synthesized first transmit signal is lower than strength of at least one of the first transmit signals received by the signal synthesizing apparatus.

11 Claims, 5 Drawing Sheets

(51) Int. Cl.
*H04B 7/06* (2006.01)
*H04B 7/08* (2006.01)
*H04B 1/12* (2006.01)
*H04B 1/525* (2015.01)

(56) References Cited

U.S. PATENT DOCUMENTS

| | | | |
|---|---|---|---|
| 4,952,193 | A | 8/1990 | Talwar |
| 6,154,634 | A | 11/2000 | Broux et al. |
| 6,573,859 | B2* | 6/2003 | Tokoro ............... G01S 7/354 342/128 |
| 7,751,845 | B2 | 7/2010 | Iwami |
| 2004/0252055 | A1 | 12/2004 | Thomas et al. |
| 2008/0169990 | A1* | 7/2008 | Taniguchi ........... H01Q 1/1278 343/713 |
| 2009/0130981 | A1* | 5/2009 | Nagai ............... H04B 1/126 455/63.1 |
| 2009/0160724 | A1* | 6/2009 | McKivergan ........... H01Q 7/00 343/867 |
| 2009/0245335 | A1 | 10/2009 | Fang |
| 2009/0264076 | A1* | 10/2009 | Nogami ............ H04B 7/0671 455/63.1 |
| 2009/0267851 | A1 | 10/2009 | Morris, III |
| 2009/0270031 | A1* | 10/2009 | Yokonaga ............... H04B 7/08 455/39 |
| 2011/0045786 | A1 | 2/2011 | Leinonen et al. |
| 2013/0201003 | A1* | 8/2013 | Sabesan ................. G01S 7/42 340/10.1 |

FOREIGN PATENT DOCUMENTS

| | | |
|---|---|---|
| CN | 101911520 | 12/2010 |
| JP | 11-55170 | 2/1999 |

OTHER PUBLICATIONS

Chinese Search Report dated Dec. 28, 2014 in corresponding Chinese Patent Application No. 2011800024956.
International Search Report mailed Aug. 2, 2012 in corresponding International Patent Application No. PCT/CN2011/081521.
PCT International Search Report and Written Opinion of the International Searching Authority dated Aug. 2, 2012 in corresponding International Patent Application No. PCT/CN2011/081521.
"Achieving Single Channel, Full Duplex Wireless Communication", Choi et al., MobiCom'10, Sep. 2010, Chicago, Illinois, 12 pp.
Extended European Search Report dated Apr. 8, 2015 in corresponding European Patent Application No. 11874533.0.

* cited by examiner

FULL-DUPLEX COMMUNICATION APPARATUS AND METHOD

CROSS-REFERENCE TO RELATED APPLICATIONS

This application is a continuation of International Application No. PCT/CN2011/081521, filed on Oct. 28, 2011, which is hereby incorporated by reference in its entirety.

TECHNICAL FIELD

The present invention relates to the field of wireless technologies, and in particular, to a full-duplex communication apparatus and method.

BACKGROUND

A microwave technology has a distinct engineering advantage in an urban area, a remote area, or a special area (such as a river) by directly transmitting data over space without laying an optical fiber, a cable, or the like. According to the microwave technology, networking is easy, a using method is flexible, and it takes little time to activate a service. With the development of the microwave technology, costs of a microwave device gradually decrease. Therefore, the microwave technology is used more and more widely.

The microwave device generally uses different frequencies to simultaneously transmit and receive signals, and a duplexer is used to separate the transmitted and received signals. However, a duplexer is generally large in size and heavy in weight. With the development of the microwave technology, a microwave device develops towards a wide frequency band, miniaturization, and low costs. However, in one aspect, it is difficult to implement miniaturization of a duplexer, and it is even difficult to integrate a duplexer into an integrated circuit chip; and in another aspect, it is difficult for a duplexer to support a wide frequency band due to its structure.

SUMMARY

Embodiments of the present invention provide a full-duplex communication apparatus and method that are used to solve problems that it is difficult to implement miniaturization and integration of a duplexer in the prior art.

An embodiment of the present invention provides a full-duplex communication apparatus, including at least one transmit antenna and at least one signal synthesizing apparatus, where the signal synthesizing apparatus is connected to at least two receive antennas, and the at least one transmit antenna is configured to transmit a first transmit signal;

the at least two receive antennas are configured to separately receive the first transmit signal; and the signal synthesizing apparatus is configured to receive the first transmit signal from the at least two receive antennas, where a phase difference exists between the received first transmit signals, and synthesize the received first transmit signals, where strength of the synthesized first transmit signal is lower than strength of at least one of the received first transmit signals.

An embodiment of the present invention provides a full-duplex communication method, including:

transmitting, by at least one transmit antenna, a first transmit signal;

separately receiving, by at least two receive antennas, the first transmit signal; and receiving, by a signal synthesizing apparatus, the first transmit signal from the at least two receive antennas, where a phase difference exists between the received first transmit signals, and synthesizing the received first transmit signals, where strength of the synthesized first transmit signal is lower than strength of at least one of the received first transmit signals.

According to the embodiments of the present invention, at least one transmit antenna is configured to transmit a first transmit signal, at least two receive antennas are configured to separately receive the first transmit signal, and a signal synthesizing apparatus is configured to receive the first transmit signal from the at least two receive antennas, where a phase difference exists between the received first transmit signals, and synthesize the received first transmit signals, where strength of the synthesized first transmit signal is lower than strength of at least one of the received first transmit signals. The signal synthesizing apparatus is used to eliminate an interfering signal from the transmit antenna, and therefore there is no need to use a duplexer to eliminate the interfering signal from the transmit antenna, that is, the duplexer can be omitted, thereby reducing installation, maintenance, and transport costs. In addition, it is difficult to implement miniaturization of a duplexer and it is difficult for a duplexer to support a wide frequency band. However, a duplexer is omitted in the embodiments of the present invention, so that a miniaturized radio frequency front end that meets a duplex communication requirement can be implemented and a wide frequency band is supported.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes embodiments of the present invention with reference to the accompanying drawings.

Figure 1:
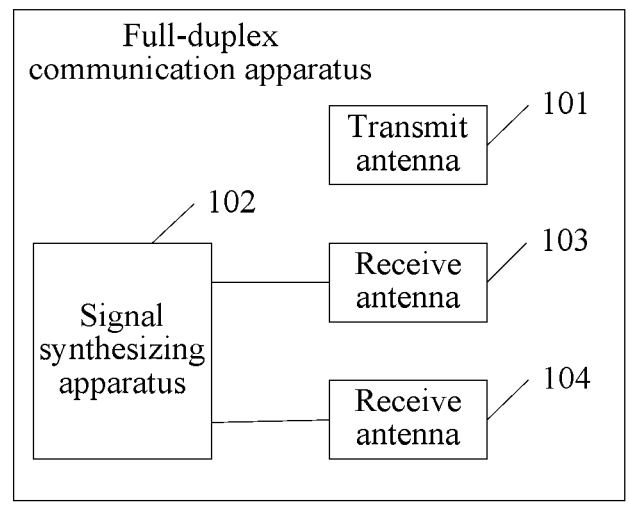
FIG. 1 is a schematic structural diagram of a full-duplex communication apparatus according to an embodiment of the present invention.

FIG. 1 is a schematic structural diagram of a full-duplex communication apparatus according to an embodiment of the present invention.

As shown in FIG. 1, at least one transmit antenna 101 and at least one signal synthesizing apparatus 102 are included, where the signal synthesizing apparatus 102 is connected to at least two receive antennas 103 and 104.

The at least one transmit antenna 101 is configured to transmit a first transmit signal, where the first transmit signal is transmitted over space to a peer apparatus, and the peer apparatus receives the first transmit signal, thereby implementing data transmission over space.

The at least two receive antennas 103 and 104 are configured to separately receive the first transmit signal. Distances from the receive antennas 103 and 104 to the transmit antenna 101 are short, and therefore the receive antennas 103 and 104 may receive an interfering signal from the transmit antenna. The interfering signal is a part of the first transmit signal and is mainly resulted from a side lobe of the first transmit signal. Due to the short distances, strength of the interfering signal is relatively high. This severely interferes with receiving of a correct signal, and therefore as many interfering signals as possible need to be eliminated.

The signal synthesizing apparatus 102 is configured to synthesize the first transmit signal from the at least two receive antennas 103 and 104, where a phase difference exists between the received first transmit signals, and synthesize the received first transmit signals, where strength of the synthesized first transmit signal is lower than strength of at least one of the first transmit signals received by the signal synthesizing apparatus 102. The phase difference that exists between the first transmit signal from the at least two receive antennas 103 and 104 may be resulted from different distances from different receive antennas to the transmit antenna, may be resulted from different transmission delays from the receive antennas to the signal synthesizing apparatus, or may be resulted from a combination of the distances and the transmission delays. The signal synthesizing apparatus 102 reduces the strength of the first transmit signal, so that the interfering signal from the transmit antenna is reduced.

According to this embodiment of the present invention, at least one transmit antenna is configured to transmit a first transmit signal, at least two receive antennas are configured to separately receive the first transmit signal, and a signal synthesizing apparatus is configured to receive the first transmit signal from the at least two receive antennas, where a phase difference exists between the received first transmit signals, and synthesize the received first transmit signals, where strength of the synthesized first transmit signal is lower than strength of at least one of the received first transmit signals. The signal synthesizing apparatus is used to eliminate an interfering signal from the transmit antenna, and therefore there is no need to use a duplexer to eliminate the interfering signal from the transmit antenna, that is, the duplexer can be omitted, thereby reducing installation, maintenance, and transport costs. In addition, it is difficult to implement miniaturization of a duplexer and it is difficult for a duplexer to support a wide frequency band. However, a duplexer is omitted in this embodiment of the present invention, so that a miniaturized radio frequency front end that meets a duplex communication requirement can be implemented and a wide frequency band is supported.

Figure 2:
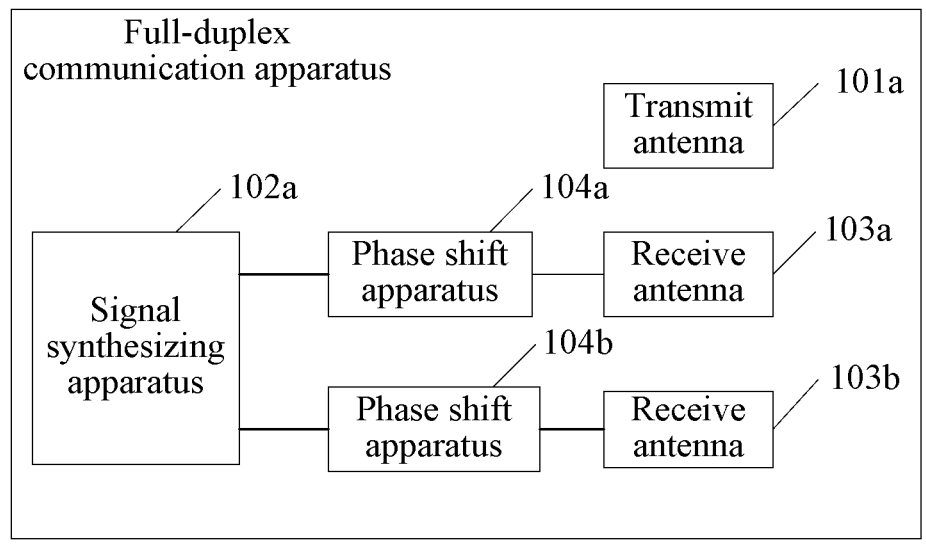
FIG. 2 is a schematic structural diagram of another full-duplex communication apparatus according to an embodiment of the present invention.

FIG. 2 is a schematic structural diagram of a full-duplex communication apparatus according to an embodiment of the present invention.

As shown in FIG. 2, a transmit antenna 101a and a signal synthesizing apparatus 102a are included, where the signal synthesizing apparatus 102a is connected to two receive antennas and the two receive antennas are a first receive antenna 103a and a second receive antenna 103b, respectively.

The transmit antenna 101a is configured to transmit a first transmit signal, where the first transmit signal is transmitted over space to a peer apparatus, and the peer apparatus receives the first transmit signal, thereby implementing data transmission over space.

The first receive antenna 103a and the second receive antenna 103b are configured to separately receive the first transmit signal. Distances from the receive antennas 103a and 103b to the transmit antenna 101a are short, and therefore the first receive antenna 103a and the second receive antenna 103b may receive an interfering signal from the transmit antenna. The interfering signal is from the first transmit signal and is mainly resulted from a side lobe of a beam of the first transmit signal. Due to the short distances, strength of the interfering signal is relatively high. This severely interferes with receiving of a correct signal, and therefore as many interfering signals as possible need to be eliminated.

The signal synthesizing apparatus 102a is configured to synthesize the first transmit signal from the first receive antenna 103a and the first transmit signal from the second receive antenna 103b, where a phase difference exists between the first transmit signal from the first receive antenna 103a and the first transmit signal from the second receive antenna 103b, and synthesize the first transmit signal from the first receive antenna 103a and the first transmit signal from the second receive antenna 103b, where strength of the synthesized first transmit signal is lower than strength of at least one of the first transmit signals received by the signal synthesizing apparatus 102a. The phase difference that exists between the first transmit signal from the at least two receive antennas 103a and 103b may be resulted from different distances from different receive antennas to the transmit antenna, may be resulted from different transmission delays from the receive antennas to the signal synthesizing apparatus, or may be resulted from a combination of the distances and the transmission delays. The signal synthesizing apparatus 102a reduces the strength of the first transmit signal, so that the interfering signal from the transmit antenna is reduced.

In this embodiment, the first receive antenna 103a and the second receive antenna 103b are configured to separately receive the first transmit signal. In another embodiment, the first receive antenna 103a and the second receive antenna 103b are further configured to separately receive first receive signal, and the signal synthesizing apparatus 102a is further configured to receive the first receive signal from the first receive antenna 103a and the first receive signal from the second receive antenna 103b and synthesize the received first receive signals, where strength of the synthesized first receive signal is higher than strength of any one of the first receive signals received by the signal synthesizing apparatus. The peer apparatus transmits a signal, and the full-duplex communication apparatus receives the signal, thereby implementing data transmission over space. The first receive signal is a signal transmitted by the peer apparatus and a signal that really needs to be received by the full-duplex communication apparatus. The case where the full-duplex communication apparatus does not receive the first receive signal may be applied to a scenario where a system is initialized or commissioning is performed for rectifying a fault, or the like.

In this embodiment, when a first transmit signal arrives at the signal synthesizing apparatus 102a, a phase difference between a first transmit signal from the first receive antenna 103a and a first transmit signal from the second receive antenna 103b is π (or approximates to π), and the first transmit signal may be essentially eliminated completely after the signal synthesis. In another embodiment, a phase difference between a first transmit signal from the first receive antenna 103a and a first transmit signal from the second receive antenna 103b may be greater than 5π/6 and less than 7π/6.

In this embodiment, the time for transmitting a signal between the signal synthesizing apparatus and the first receive antenna is the same as that between the signal synthesizing apparatus and the second receive antenna. Neither a phase difference is introduced between the first transmit signals, nor a phase difference is introduced between the first receive signals. In another embodiment, a phase difference that is between the first receive signals and resulted from different distances of transmission lines may be less than π/6, and therefore as many impacts on the first receive signals as possible can be reduced.

In this embodiment, there is only one transmit antenna. In another embodiment, there may be multiple transmit antennas, for example, including a first transmit antenna and a second transmit antenna, where both the first transmit antenna and the second transmit antenna transmit a first transmit signal. A distance difference x exists between distances from a first receive antenna and a second receive antenna to a beam center of the first transmit signal. A specific method for placing the receive antennas is not defined during designing. They may be placed on one side of the beam center, or may be separately placed on both sides of the beam center, as long as interfering signals from the transmit antennas can be canceled mutually on the signal synthesizing apparatus and strength can be significantly reduced or even be eliminated.

In this embodiment, the signal synthesizing apparatus 102a is connected to the two receive antennas. In another embodiment, the signal synthesizing apparatus 102a may be connected to three or more receive antennas. For example, when the signal synthesizing apparatus 102a is connected to three receive antennas, and the three receive antennas are a first receive antenna, a second receive antenna, and a third receive antenna, respectively, a phase difference for transmitting a first transmit signal between the synthesizing apparatus and the three receive antennas is less than π/6. A distance from the first receive antenna to the beam center of the first transmit signal is the shortest, and a distance from the third receive antenna to the beam center of the first transmit signal is the farthest. A distance difference y exists between distances from the first receive antenna and the second receive antenna to the beam center of the first transmit signal, and a distance difference y exists between distances from the second receive antenna and the third receive antenna to the beam center of the first transmit signal, where y is ⅓ of a wavelength of the first transmit signal. In another embodiment, another design may be used to place the three receive antennas, as long as interfering signals from the transmit antennas can be canceled mutually on the signal synthesizing apparatus and strength can be significantly reduced or even be eliminated.

In this embodiment, a signal phase difference resulted from transmission of a signal between the signal synthesizing apparatus and the first receive antenna and between the signal synthesizing apparatus and the second receive antenna is zero or less than π/6. The phase difference between the first transmit signals on the signal synthesizing apparatus are mainly resulted from different distances from the two receive antennas to the transmit antenna. If the distances are fixed, a frequency of the transmit signal that is supported by the full-duplex communication apparatus is limited. In this case, phase shift apparatuses 104a and 104b may be added between the receive antennas and the signal synthesizing apparatus, so that the full-duplex communication apparatus is capable of supporting a wide frequency range. The maximum wavelength of the transmit signal that is supported by the transmit antenna 101a is $\lambda_1$, and the supported minimum wavelength of the transmit signal is $\lambda_2$. A distance difference x exists between distances from the first receive antenna 103a and the second receive antenna 103b to the beam center of the first transmit signal, where $$\frac{\lambda_2}{2} \le x \le \frac{\lambda_1}{2}.$$

When the wavelength of the first transmit signal is $\lambda_3$ ($\lambda_2 \le \lambda_3 \le \lambda_1$), a phase shift range is adjusted for the phase shift apparatuses 104a and/or 104b to ensure that the phase difference between the first transmit signals on the signal synthesizing apparatus and from the two receive antennas is π (or approximates to π). The first transmit signal may be essentially eliminated completely after the signal synthesis. In another embodiment, a phase difference between a first transmit signal from the first receive antenna 103a and a first transmit signal from the second receive antenna 103b may be greater than 5π/6 and less than 7π/6. This can also achieve an effect of significantly reducing the strength of the first transmit signal.

According to this embodiment, an interfering signal is eliminated by designing a distance from a receive antenna to a transmit antenna.

Figure 3:
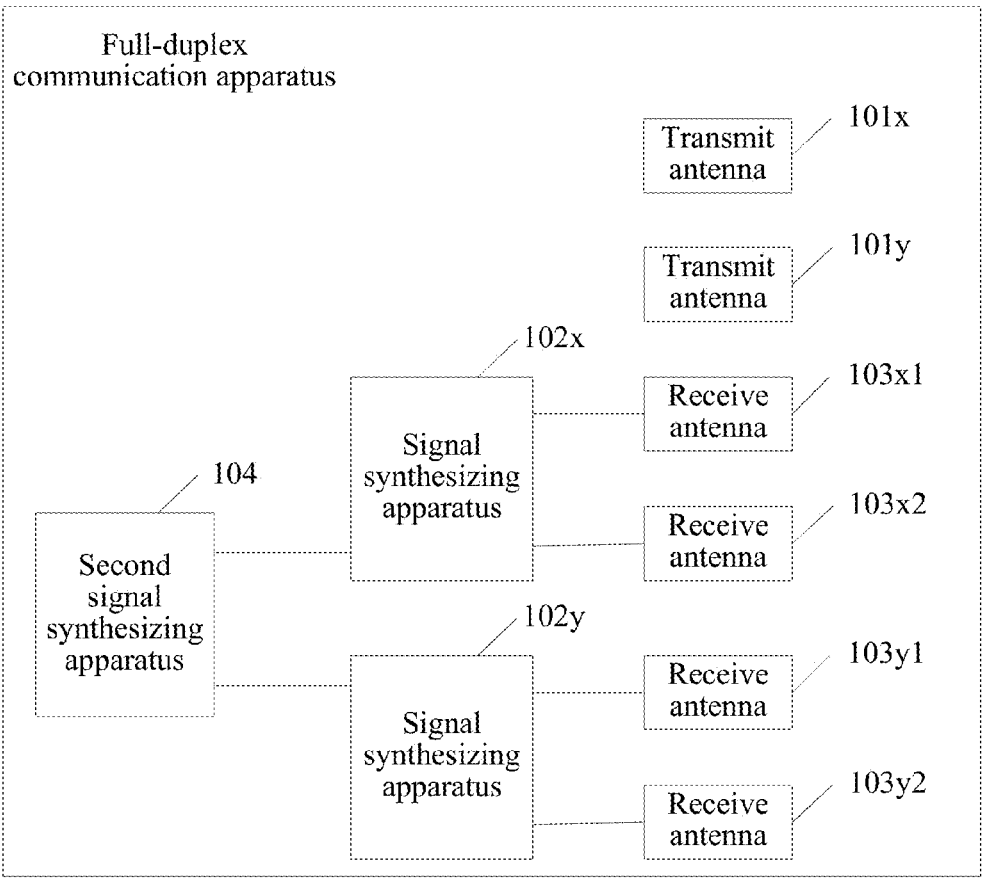
FIG. 3 is a schematic structural diagram of still another full-duplex communication apparatus according to an embodiment of the present invention.

FIG. 3 is a schematic structural diagram of a full-duplex communication apparatus according to an embodiment of the present invention.

As shown in FIG. 3, a transmit antenna 101x, a transmit antenna 101y, a signal synthesizing apparatus 102x, and a signal synthesizing apparatus 102y are included, where the signal synthesizing apparatus 102x is connected to a receive antenna 103x1, the signal synthesizing apparatus 102x is connected to a receive antenna 103x2, the signal synthesizing apparatus 102y is connected to a receive antenna 103y1, and the signal synthesizing apparatus 102y is connected to a receive antenna 103y2.

The transmit antenna 101x is configured to transmit a first transmit signal, and the transmit antenna 101y is configured to transmit a first transmit signal, where the first transmit signal is transmitted over space to a peer apparatus, and the peer apparatus receives the first transmit signal, thereby implementing data transmission over space.

The receive antenna 103x1 is configured to receive the first transmit signal, and the receive antenna 103x2 is configured to receive the first transmit signal. The signal synthesizing apparatus 102x is configured to synthesize the first transmit signal from the receive antenna 103x1 and the first transmit signal from the receive antenna 103x2. When the first transmit signal arrives at the signal synthesizing apparatus 102x, a phase difference π (or approximating to π) exists between a first transmit signal from the receive antenna 103x1 and a first transmit signal from the receive antenna 103x2. During the synthesis, the first transmit signal from the receive antenna 103x1 and the first transmit signal from the receive antenna 103x2 are canceled mutually. In this case, strength of the first transmit signal obtained after the synthesis is lower than strength of at least one of the first transmit signals received by the signal synthesizing apparatus 102x.

The receive antenna 103x1 is further configured to receive a first receive signal, and the receive antenna 103x2 is further configured to receive a first receive signal. The signal synthesizing apparatus 102x is further configured to synthesize the first receive signal from the receive antenna 103x1 and the first receive signal from the receive antenna 103x2. When the first receive signal arrives at the signal synthesizing apparatus 102x, no phase difference (or a very small phase difference) exists between a first receive signal from the receive antenna 103x1 and a first receive signal from the receive antenna 103x2. During the synthesis, the first receive signal from the receive antenna 103x1 and the first receive signal from the receive antenna 103x2 strengthen each other. In this case, strength of the first receive signal obtained after the synthesis is higher than strength of any one of the first receive signals received by the signal synthesizing apparatus 102x.

The receive antenna 103y1 is configured to receive the first transmit signal, and the receive antenna 103y2 is configured to receive the first transmit signal. The signal synthesizing apparatus 102y is configured to synthesize the first transmit signal from the receive antenna 103y1 and the first transmit signal from the receive antenna 103y2. When the first transmit signal arrives at the signal synthesizing apparatus 102y, a phase difference π (or approximating to π) exists between a first transmit signal from the receive antenna 103y1 and a first transmit signal from the receive antenna 103y2. During the synthesis, the first transmit signal from the receive antenna 103y1 and the first transmit signal from the receive antenna 103y2 are canceled mutually. In this case, strength of the first transmit signal obtained after the synthesis is lower than strength of at least one of the first transmit signals received by the signal synthesizing apparatus 102y.

The receive antenna 103y1 is further configured to receive the first receive signal, and the receive antenna 103y2 is further configured to receive the first receive signal. The signal synthesizing apparatus 102y is further configured to synthesize the first receive signal from the receive antenna 103y1 and the first receive signal from the receive antenna 103y2. When the first receive signals arrive at the signal synthesizing apparatus 102y, no phase difference (or a very small phase difference) exists between a first receive signal from the receive antenna 103y1 and a first receive signal from the receive antenna 103y2. During the synthesis, the first receive signal from the receive antenna 103y1 and the first receive signal from the receive antenna 103y2 strengthen each other. In this case, strength of the first receive signal obtained after the synthesis is higher than strength of any one of the first receive signals received by the signal synthesizing apparatus 102y.

After the synthesis, the signal synthesizing apparatus 102x mainly includes the first receive signal and residual first transmit signals. After the synthesis, the signal synthesizing apparatus 102y also mainly includes the first receive signal and residual first transmit signals. A second signal synthesizing apparatus 104 is configured to receive a signal from the signal synthesizing apparatus 102x and a signal from the signal synthesizing apparatus 102y and synthesize the received first transmit signals. Distance differences exist between distances from a receive antenna group (103x1 and 103x2) and a receive antenna group (103y1 and 103y2) to the transmit antennas. Therefore, a phase difference π (or approximating to π) exists between the first transmit signals on the second signal synthesizing apparatus 104. During the synthesis, the first transmit signal from the signal synthesizing apparatus 102x and the first transmit signal from the signal synthesizing apparatus 102y are canceled mutually. In this case, strength of the first transmit signal obtained after the synthesis is lower than strength of at least one of the first transmit signals received by the second signal synthesizing apparatus 104. The second signal synthesizing apparatus 104 is further configured to synthesize the received first receive signals, where strength of the synthesized first receive signal is higher than strength of any one of the first receive signals received by the second signal synthesizing apparatus 104. In another embodiment, a phase shift apparatus is included between the second signal synthesizing apparatus 104 and the signal synthesizing apparatus 102x. The phase shift apparatus may perform a phase shift only on the first transmit signal from the signal synthesizing apparatus 102x to ensure that a phase difference between the first transmit signals received from the signal synthesizing apparatus 102x and the signal synthesizing apparatus 102y on the second signal synthesizing apparatus 104 is π (or approximates to π), thereby achieving a best cancellation effect. Certainly, a phase shift apparatus may also be arranged between the second signal synthesizing apparatus 104 and the signal synthesizing apparatus 102y to perform a phase shift on the first transmit signal from the signal synthesizing apparatus 102y, so that a phase difference between the first transmit signals received from the signal synthesizing apparatus 102x and the signal synthesizing apparatus 102y on the second signal synthesizing apparatus 104 is π (or approximates to π), thereby achieving a best cancellation effect. In this case, two phase shift apparatuses are required.

According to this embodiment of the present invention, two transmit antennas are used to transmit a first transmit signal simultaneously, so that a gain of the transmit signal is improved, and two groups of receive systems are used to receive a signal simultaneously, so that a gain of the receive signal is improved. Certainly, there may be more transmit antennas and more receive systems. In this case, high gain communication can be implemented.

Figure 4:
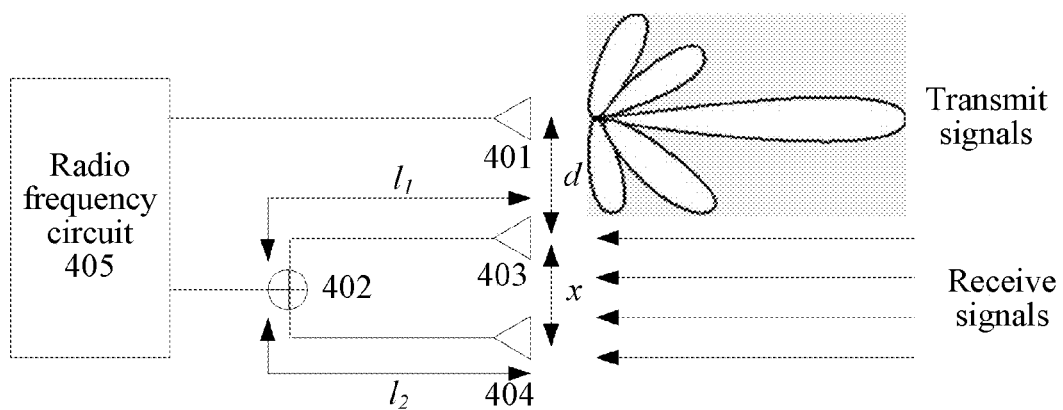
FIG. 4 is a schematic structural diagram of still another full-duplex communication apparatus according to an embodiment of the present invention.

FIG. 4 is a schematic structural diagram of a full-duplex communication apparatus according to an embodiment of the present invention.

As shown in FIG. 4, a microwave communication apparatus is taken as an example for description. It includes a transmit antenna 401, two receive antennas 403 and 404, a signal synthesizing circuit 402, and another radio frequency circuit 405, where a certain distance difference x exists between distances from the two receive antennas to the transmit antenna, a distance from the transmit antenna to the nearest receive antenna is d, lengths of transmission lines between the two receive antennas and the signal synthesizing circuit are $l_1$ and $l_2$, respectively, and the relative permittivity of the transmission lines is $\epsilon$. In this system, a frequency of transmit signal is $f_1$ and a wavelength of the transmit signal is $\lambda_1$; and a frequency of receive signal is $f_2$ and a wavelength of the receive signal is $\lambda_2$.

In this apparatus, in addition to a noise signal and a receive signal, the receive antennas may also receive a part of transmit signals. These transmit signals are mainly resulted from aside lobes of the transmit signals, and they are also interfering signals. In addition, because the distance from the transmit antenna to a receive antenna is relatively short, strength of these interfering signals is very strong with respect to the receive signals. This severely interferes with receiving of a correct signal, and therefore as many interfering signals as possible need to be eliminated. In addition, for a receive signal in a microwave system, because a distance is generally far, the receive signal may be regarded as parallel waves and an entrance angle of the parallel waves approximates to zero degree after antenna calibration.

In this embodiment, a method of cancellation by signal synthesis is used to eliminate an interfering signal from the transmit antenna. The apparatus meets the following condition that a phase difference between the transmit signals from the two receive antennas to the signal synthesizing circuit is $\pi$, that is $x+\sqrt{\epsilon}(l_2-l_1)=\lambda_1/2$. The receive signals are parallel waves, and the entrance angle approximates to zero degree. Therefore, in this embodiment, to ensure that receive signals with a same phase are superposed, it is required that $l_1=l_2$, that is $x=\lambda_1/2$.

When the system runs, the following two cases will occur on the signal synthesizing circuit:

1. For an interfering signal formed by the transmit antenna, a phase difference between signals received from the two receive antennas is $\pi$, and $S(+)=A \cos(2\pi f_1 t+\phi_1)+A \cos(2\pi f_1 t+\phi_1+\pi)=0$. Therefore, all the interfering signals are canceled after the signal synthesis.

2. For the receive signal, $l_1=l_2$, a phase difference between signals passing through the two receive antennas is zero, and $S(+)=A_2 \cos(2\pi f_2 t+\phi_2)+A_2 \cos(2\pi f_2 t+\phi_2)=2A_2 \cos(2\pi f_2 t+\phi_2)$. Therefore, strength of the signal increases two times.

When the signal synthesis is performed, a certain error may exist between a phase difference between two channels of interfering signals from the two receive antennas and $\pi$ due to a process error or the like in actual implementation, and the signal is not canceled completely. However, after the preceding processing is performed, strength of the interfering signal is significantly reduced.

In addition, this embodiment only describes a case where there are one transmit antenna and two receive antennas. There may also be multiple transmit antennas and multiple receive antennas. In this case, a certain distance need to be guaranteed from the multiple receive antennas to a beam center of the transmit signal, so that interfering signals from the multiple receive antennas can be canceled at a position where the signal synthesis is performed.

Secondly, this embodiment only describes a case where a signal synthesizing circuit is connected to two receive antennas. The case may be that multiple antennas are connected to a synthesizing circuit, for example, three antennas. In this case, antenna positions and lengths of transmission lines may be designed to ensure that a phase difference between any two received interfering signals arriving at the position where the signal synthesis is performed is 120 degrees. In this case, the interfering signal may also be canceled mutually after being synthesized.

This embodiment of the present invention provides a full-duplex microwave apparatus, which eliminates an interfering signal by designing a distance from a receive antenna to a transmit antenna. In this case, a duplexer is omitted, and a design of integrating the microwave apparatus can be implemented.

Figure 5:
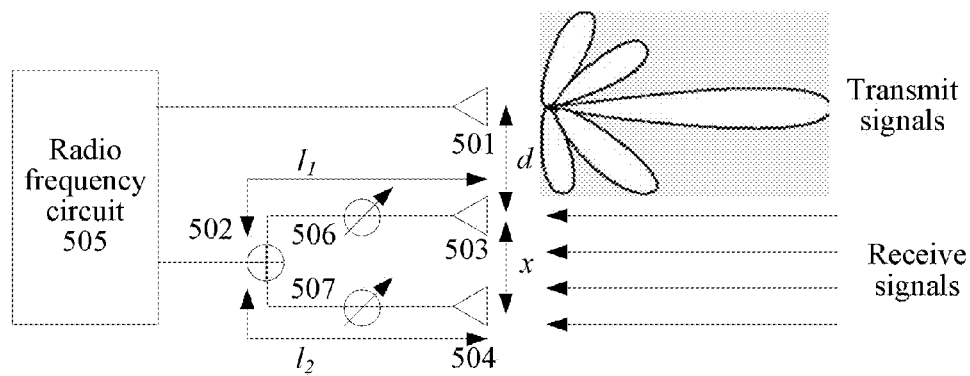
FIG. 5 is a schematic structural diagram of still another full-duplex communication apparatus according to an embodiment of the present invention.

FIG. 5 is a schematic structural diagram of a full-duplex communication apparatus according to an embodiment of the present invention.

As shown in FIG. 5, a difference between this embodiment and the preceding embodiment is that a phase shift apparatus is added between a receive antenna and a signal synthesizing circuit. The full-duplex communication apparatus includes a transmit antenna 501, two receive antennas 503 and 504, a signal synthesizing circuit 502, and another radio frequency circuit 505. A phase shift apparatus 506 is included between the receive antenna 503 and the signal synthesizing circuit 502, a phase shift apparatus 507 is included between the receive antenna 504 and the signal synthesizing circuit 502, and the phase shift apparatus 506 and the phase shift apparatus 507 may be phase shift circuits or phase shifters. A frequency that can be supported in the preceding embodiment is relevant to a set antenna distance. After the antenna distance is fixed to x, the frequency that can be supported is limited to about $$f_o = \frac{c}{\lambda} \approx \frac{c}{2x}.$$

When a transmit frequency deviation from $f_o$ is relatively large, interference cancellation performance may be relatively poor.

In this embodiment, a phase shift circuit or a phase shifter is added between a receive antenna and a signal synthesizing circuit, and a phase shift is performed on an interfering signal received by each receive antenna from the transmit antenna. This cancels the interfering signal to a maximum extent after the interfering signal is synthesized.

Herein, two receive antennas are still taken as an example to describe a method for implementing a radio frequency front-end system that supports a frequency band of 13 GHz (12.75-13.25 GHz) and a frequency band of 15 GHz (14.5-14.62 GHz or 15.23-15.35 GHz). In this system, the minimum frequency is 12.75 GHz (a wavelength is about 23.5 mm), and the maximum frequency is 15.35 GHz (a wavelength is about 19.5 mm). Herein, assuming that $l_1=l_2$ and $x=10.65$ mm, when a frequency of a transmit signal is 12.75 GHz, a phase difference between receive signals from the two receive antennas is about 163 degrees ($\pi-17°$). Then, after a phase shift performed by the phase shift apparatus 507 is set to about 17 degrees, the phase difference between receive signals of two channels may be adjusted to $\pi$ or approximately $\pi$.

In this method, receive signals that are from multiple antennas and have a same phase may not be superposed due to the phase shift. However, a phase difference between these receive antennas is relatively small (generally less than 30 degrees). In this case, the effect of strengthening a signal by superposition is minor.

According to this embodiment of the present invention, a phase shift apparatus is included between a receive antenna and a signal synthesizing circuit, so that a wide frequency band range can be supported.

Figure 6:
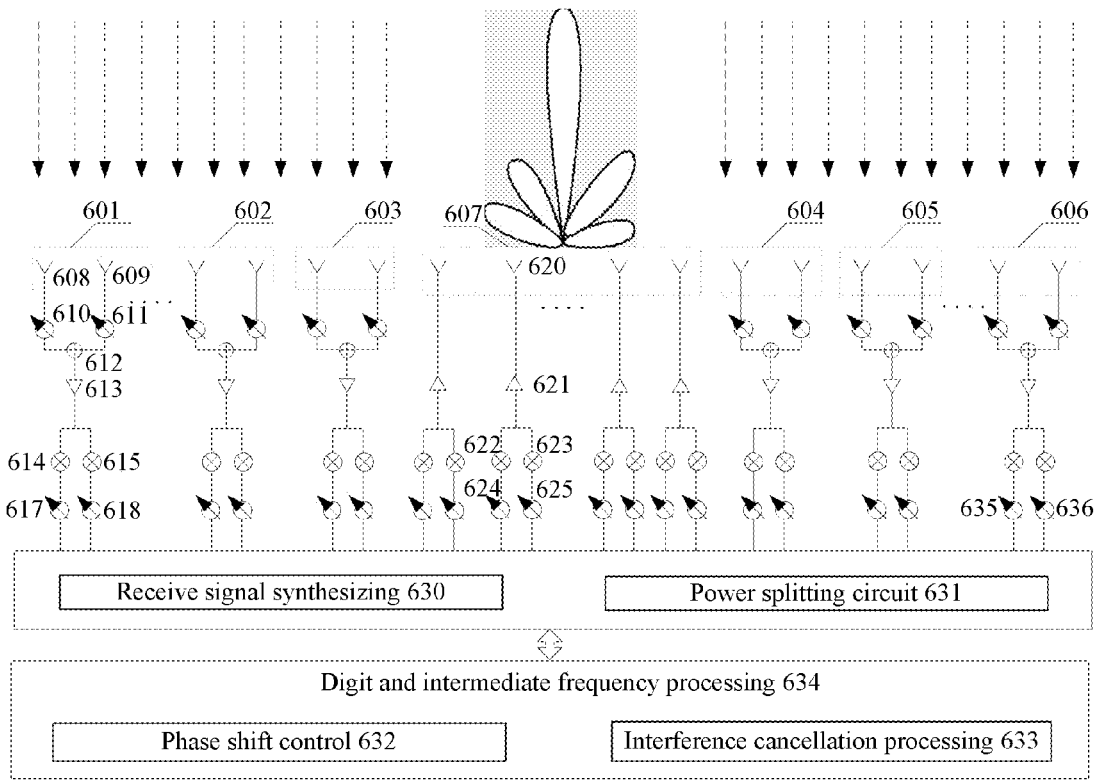
FIG. 6 is a schematic structural diagram of still another full-duplex communication apparatus according to an embodiment of the present invention.

FIG. 6 is a schematic structural diagram of a full-duplex communication apparatus according to an embodiment of the present invention.

As shown in FIG. 6, this embodiment provides a high gain system that is capable of supporting a wide frequency band range. If a high gain antenna is used in the microwave application scenarios in the preceding two embodiments, a large space may be occupied. If a miniature antenna, such as a microstrip antenna, a slot antenna, or a horn antenna, is used, a problem that a gain is too low may be caused.

In this embodiment, an array antenna formed by miniature antennas is used to implement a high gain. The array antenna may be in a form of a microstrip array antenna, a slot array antenna, or a horn array antenna, which is not enumerated herein.

This embodiment is implemented by using an array antenna method. The array antenna includes multiple transmit antenna units and multiple receive antenna units, where two (or more, two antennas are taken as an example herein) receive antennas form a group and are connected to each other by using a signal synthesizing circuit, a phase shift circuit (or a phase shifter) exists between an antenna in each group of receive antennas and the signal synthesizing circuit, and a certain distance difference is kept between distances from each antenna in each group of receive antennas to a transmit beam center to cooperate with the phase shift circuit, so that a phase difference between interfering signals that are resulted from a transmit antenna and received from a group of receive antennas is π (or approximates to π) when the interfering signal arrives at a position where signal synthesis is performed, thereby canceling the interfering signal and strengthening the receive signal simultaneously.

After signal synthesis is performed on a signal received by each group of receive antennas to implement interference cancellation, a phase shift and synthesis are further performed to further cancel the interfering signal between signals from multiple groups of receive antennas and strengthen the receive signal. The phase shift operation may be performed by using a radio frequency module, an up-conversion module, an intermediate frequency module, or a baseband module. FIG. 6 describes a method for performing the phase shift and synthesis based on a signal after down-conversion is performed.

In a transmission direction, a high transmit signal gain may be implemented by synthesizing space signals to meet a requirement on a transmission distance. In addition, a phase of a transmit signal from each transmit antenna unit is adjusted by using a phase shift circuit, and therefore a beam direction is adjusted. The phase shift operation may be performed at a radio frequency, an up-conversion frequency, an intermediate frequency, or baseband. The figure in this embodiment describes a method for performing the phase shift based on a signal before up-conversion is performed.

In addition, interference cannot be canceled completely due to restrictions on a circuit, a process, or the like in actual implementation, and therefore an extra circuit or algorithm for canceling interference may be introduced at baseband, an intermediate frequency, or a radio frequency part to achieve a better effect of interference cancellation.

A microwave duplex system described in FIG. 6 includes multiple transmit antenna units and multiple receive antenna units. A frequency range of transmit signal that is supported by the system is $f_1$-$f_2$, and a corresponding wavelength range of the transmit signal is $\lambda_2$-$\lambda_1$.

In the transmission direction, data enters a radio frequency circuit after passing through digit and intermediate frequency processing module 634, and a power splitting circuit 631 splits radio frequency signals to be transmitted into multiple channels of radio frequency signals, so that the multiple channels of radio frequency signals enter multiple transmit channels. A transmit channel where a transmit antenna unit 620 is located is taken as an example. After signals pass through phase shifts 624 and 625 and up-conversions 622 and 623 to a carrier frequency and are processed by an amplifier 621, the signals are transmitted through the transmit antenna unit 620. After power synthesis over space, power of signals transmitted by multiple transmit antenna units 607 increases in a certain direction by controlling an angle of a phase shift. In this way, sufficient gains are obtained for implementing transmission in a relatively far distance. A beam in this direction is a central beam. However, a beam formed finally still include a side lobe (side lobe) or a grating lobe (grating lobe), and the side lobe may have an impact on a receive antenna unit for receiving a signal to be received from a remote end.

In a receive direction, the system includes multiple receive antenna units, where two receive antennas form a group, for example, there are 6 receive antenna groups from 601 to 606. A receive path where the antenna group 601 is located is taken as an example. Two receive antenna units 608 and 609 are included. A distance difference x exists between differences from the two receive antenna units to the central beam in the transmission direction. In this embodiment, x is $\lambda_x/2$ ($\lambda_2 \leq \lambda_x \leq \lambda_1$). A signal to be received from the remote end and a transmit signal from a transmit antenna of a local end are received simultaneously, where the signal to be received is a signal that needs to be received correctly and the transmit signal from the transmit antenna of the local end is an interfering signal that is generally resulted from a side lobe or grating lobe of a transmit beam.

(1) Processing from a Receive Antenna to a Signal Synthesizing Circuit

Processing on an interfering signal from the transmit antenna of the local end is as follows:

A distance from the transmit antenna of the local end to the receive antenna is very short. In this case, power of the interfering signal is generally much greater than power of the signal to be received from the remote end. A distance difference x exists between distances from the receive antenna units 608 and 609 to the central beam in the transmission direction, and $x=\lambda_x/2$ ($\lambda_2 \leq \lambda_x \leq \lambda_1$). Therefore, a phase difference $\pi \pm \phi$ (generally $\phi \leq 30°$) exists between two channels of interfering signals from the receive antenna units 608 and 609. The two channels of interfering signals separately pass through phase shift circuits 610 and 611 and then arrive at a signal synthesizing circuit 612. Considering a phase difference σ of the two channels of signals resulted from a length difference between transmission lines between the receive antenna 608 and the signal synthesizing circuit 612 and between the receive antenna 609 and the signal synthesizing circuit 612 and a delay difference between the phase shift circuit 610 and the phase shift circuit 611, the phase shift circuit 610 and/or the phase shift circuit 611 is adjusted, so that the phase difference between the two channel of signals on the signal synthesizing circuit 612 is or approximates to π. In addition, the distance difference is extremely small, and strength of the two channels of interfering signals is approximately the same. In a case where antenna gains are same or approximately the same, after experiencing signal synthesis on the signal synthesizing circuit 612, the two channels of interfering signals may are canceled mutually, so that no interfering signals or very weak interfering signals exist in signals obtained after the synthesis.

Processing of the signal to be received from the remote end is as follows:

The receive antenna units 608 and 609 each receive a channel of signals to be received. After a local antenna is aligned with a remote antenna, incidence of the signals to be received from the remote end is parallel or approximately parallel. Therefore, a phase difference between the two channels of signals to be received is zero or approximates to zero. The two channels of signals to be received separately pass through the phase shift circuit 610 and the phase shift circuit 611 and then arrive at the signal synthesizing circuit 612. Phase shift operations of the phase shift circuit 610 and the phase shift circuit 611 may cause the two channels of signals to be received to have a certain phase difference $\phi_1$, and the length difference between the transmission lines between the receive antenna 608 and the signal synthesizing circuit 612 and between the receive antenna 609 and the signal synthesizing circuit 612, a delay difference between the phase shift circuit 610 and the phase shift circuit 611, or the like also cause an extra phase difference $\phi_2$. However, $\phi_1$ is generally less than $\phi_2$, and therefore the two channels of signals to be received may still be strengthened on the signal synthesizing circuit 612.

After passing through the signal synthesizing circuit 612, synthesized signals are obtained, including residual interfering signals from the transmit antenna and strengthened signals to be received and certainly further including other interfering signals, where strength of the residual interfering signals from the transmit antenna is much lower than strength of interfering signals received by the antennas.

(2) Processing after the Signal Synthesizing Circuit

The synthesized signals obtained from the signal synthesizing circuit 612 are split into two channels of signals after passing through a low noise amplifier (LNA) 613. The two channels of signals are down-converted by using mixers 614 and 615 to obtain I and Q channels of signals. A distance difference also exists between distances from different antenna groups to the central beam in the transmission direction. For example, a distance difference between distances from the antenna group 601 and the antenna group 606 to the central beam is y, and y=$\lambda_y/2$ ($\lambda_2 \leq \lambda_y \leq \lambda_1$). In this case, one or more of phase shift circuits 617, 618, 635, and 636 may be adjusted to further reduce the strength of the interfering signal from the transmit antenna. Certainly, phase shift circuits corresponding to multiple antenna groups may also be adjusted simultaneously to cancel the interfering signal. Simultaneously, in the receive direction, an entrance angle of the signal to be received approximates to zero degree, and therefore a phase difference is relatively small between the I channel of signals and Q channel of signals that are obtained from the antenna group 601 and signals to be received in the I channel of signals and Q channel of signals that are obtained from other antenna groups 602, 603, 604, 605, 606, or the like. Signal synthesis is further performed separately on the I channel of signals and the Q channel of signals from the receive antenna groups by receive signal synthesizing 630 to obtain a higher strength gain of the signal to be received.

Residual interfering signals from the transmit antenna still exist in the synthesized signals. If the interfering signals are excessively strong, they may still affect decoding of the signals to be received. Therefore, extra interference cancellation processing 633 is introduced in the digit and intermediate frequency processing module 634 to further eliminate the interference herein. In addition, phase shift control 632 in the digit and intermediate frequency processing module is configured to control a phase shift size of a phase shift circuit in the system. Herein, the phase shift control module includes at least three submodules, which separately control a phase shift circuit in the transmission direction, a phase shift circuit at an antenna side in the receive direction, and a phase shift circuit used after down-conversion in the receive direction.

In this embodiment, a high gain microwave duplex system is implemented by using multiple transmit antennas and multiple groups of receive systems.

Figure 7A:
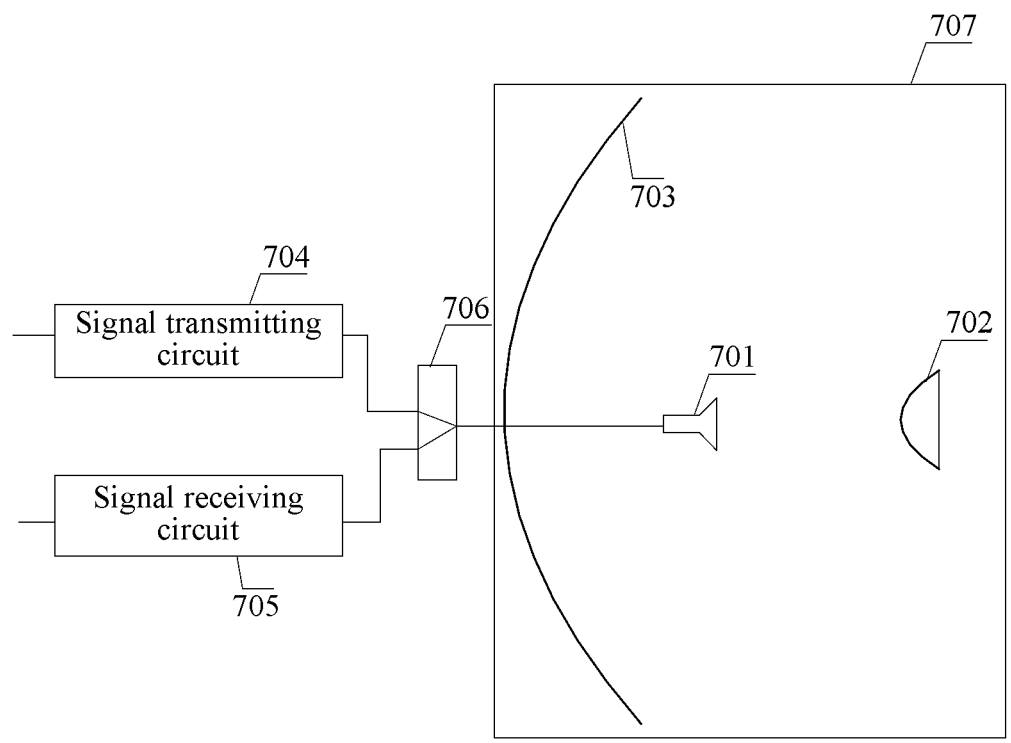
FIG. 7a is a high gain full-duplex system in the prior art.
Figure 7B:
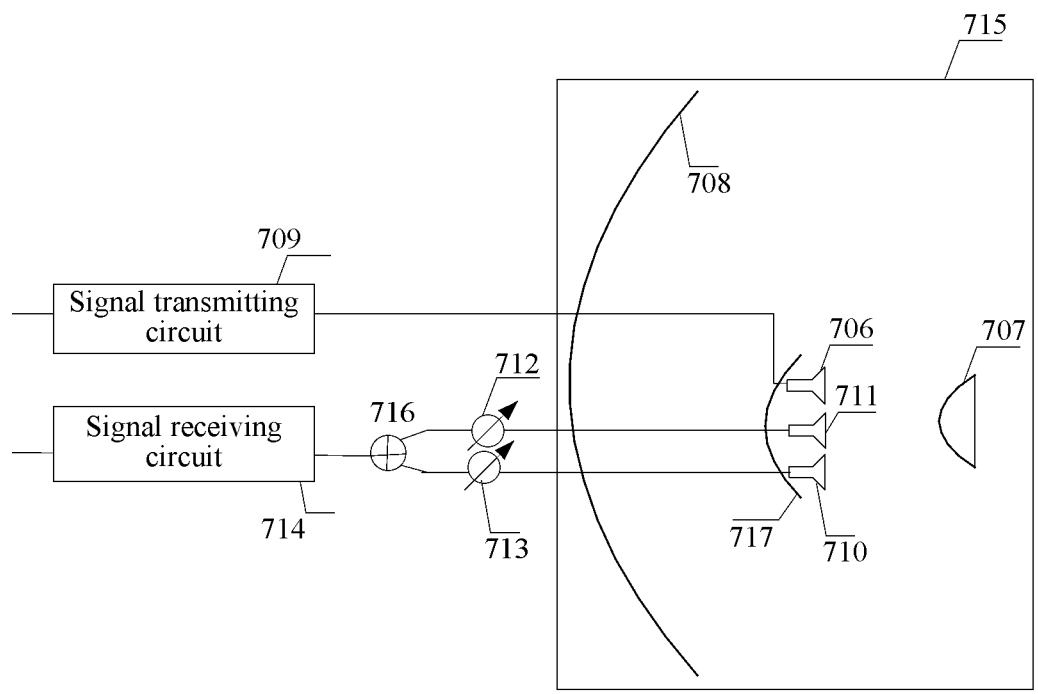
FIG. 7b is a high gain full-duplex system according to an embodiment of the present invention.

FIG. 7a and FIG. 7b describe high gain full-duplex systems. Such a system reflects, by using two reflective surfaces, receive a signal from a remote end and a transmit signal from a feed antenna to focus a beam, thereby obtaining a high gain.

FIG. 7a describes a high gain full-duplex system that is based on a conventional Cassegrain antenna. The system includes a Cassegrain antenna 707, a duplexer 706, a signal transmitting circuit 704, and a signal receiving circuit 705, where the Cassegrain antenna 707 includes a feed antenna 701, a sub-reflective surface 702, and a main reflective surface 703.

FIG. 7b describes a high gain full-duplex system that is transformed based on a Cassegrain antenna. The system includes a transformed Cassegrain antenna 715, a phase shift circuit 712, a phase shift circuit 713, a signal synthesizing circuit 716, a signal transmitting circuit 709, and a signal receiving circuit 714, where the transformed Cassegrain antenna 715 includes a transmit feed antenna 706, two receive feed antennas 710 and 711, a sub-reflective surface 707, and a main reflective surface 708. In addition to a signal delay introduced by the phase shift circuit 712 and the phase shift circuit 713, transmission delays between the two receive feed antennas 710 and 711 and the signal receiving circuit 714 are same or nearly the same. A frequency range of transmit signal that is supported by the system is $f_1$-$f_2$, and a corresponding wavelength range of the transmit signal is $\lambda_2$-$\lambda_1$. The two receive feed antennas 710 and 711 are placed near the transmit feed antenna 706, and a distance difference x between distances from the two receive feed antennas to the transmit feed antenna 706 is $\lambda_x/2$ ($\lambda_2 \leq \lambda_x \leq \lambda_1$). Transmit apertures of the two receive feed antennas 710 and 711 are on a same plane, and are parallel to a transmit aperture of the transmit feed receive 706. These three feed antennas may be on a same straight line.

Processing in a transmission direction is as follows:

A transmit signal is provided for the transmit feed antenna 706 by the signal transmitting circuit 709. A space signal generated by the transmit feed antenna 706 is reflected by the sub-reflective surface 707 and then reflected by the main reflective surface 708. Finally, a beam is focused in a certain direction and transmitted.

Processing in a receive direction is as follows:

Receive a signal S0 from the remote end focus on the sub-reflective surface 707 after being reflected by the main reflective surface 708 and form parallel waves after being transmitted by the sub-reflective surface 707. The parallel waves are received by the two receive feed antennas 710 and 711 and enter the signal receiving circuit for processing after being synthesized on the signal synthesizing circuit 716. However, the two receive feed antennas 710 and 711 may simultaneously receive a transmit signal S1 (mainly resulted from a reverse side lobe) from the transmit feed antenna 706, transmit a signal S2 reflected from the main reflective surface 708, and a transmit signal S3 transmitted from the sub-reflective surface 707. S1, S2, and S3 are interfering signals, which interfere with receiving of a signal to be received.

For the transmit signal S1 from the transmit feed antenna 706, there is a phase difference $\pi \pm \phi$ (generally $\phi \leq 30°$) between signals received by the two receive feed antennas.

Then, phase shift processing is performed by using the phase shift circuit 712 or 713 to ensure that a phase difference between interfering signals from the two receive feed antennas 710 and 711 approximates to $\pi$ when the interfering signals arrive at the signal synthesizing circuit 716. Therefore, the interfering signals can be canceled mutually after the signals are synthesized, and strength of the interfering signals can be significantly reduced. Although the phase shift processing may also brings a certain phase change to the receive signal S0 received from the remote end and cause a certain phase difference between the signal S0 received by the two receive feed antennas, the signal S0 received by the two receive feed antennas is still strengthened after being synthesized on the signal synthesizing circuit 716 due to that a phase shift angle herein is generally small during the phase shift processing.

For the transmit signal S2 reflected from the main reflective surface 708, a protection cover 717 may be added between the main reflective surface and the receive feed antenna to eliminate the interfering signal S2 on the receive feed antenna. Generally, the interfering signal S2 cannot be eliminated completely, and residual interfering signal S2 may still enter the signal receiving circuit through the receive feed antenna.

For the transmit signal S3 transmitted from the sub-reflective surface 707, a coating may be added at a center position of the sub-reflective surface to eliminate the interfering signal S3 on the receive feed antenna. Generally, the interfering signal S3 cannot be eliminated completely, and residual interfering signal S3 may still enter the signal receiving circuit through the receive feed antenna.

Generally, the interfering signals S1, S2, and S3 cannot be eliminated completely. Therefore, if the interfering signals are excessively strong, decoding of the signals to be received may still be affected. Extra interference cancellation processing may also be introduced in a digit and intermediate frequency processing module to further eliminate interference herein.

In this embodiment, the feed antenna is generally a miniature antenna or a miniature array antenna, such as a horn antenna, a microstrip antenna, a horn array antenna, or a microstrip array antenna, which is not limited herein.

In this embodiment, a high gain microwave duplex system is implemented by using multiple feed antennas and reflective surfaces.

Figure 8:
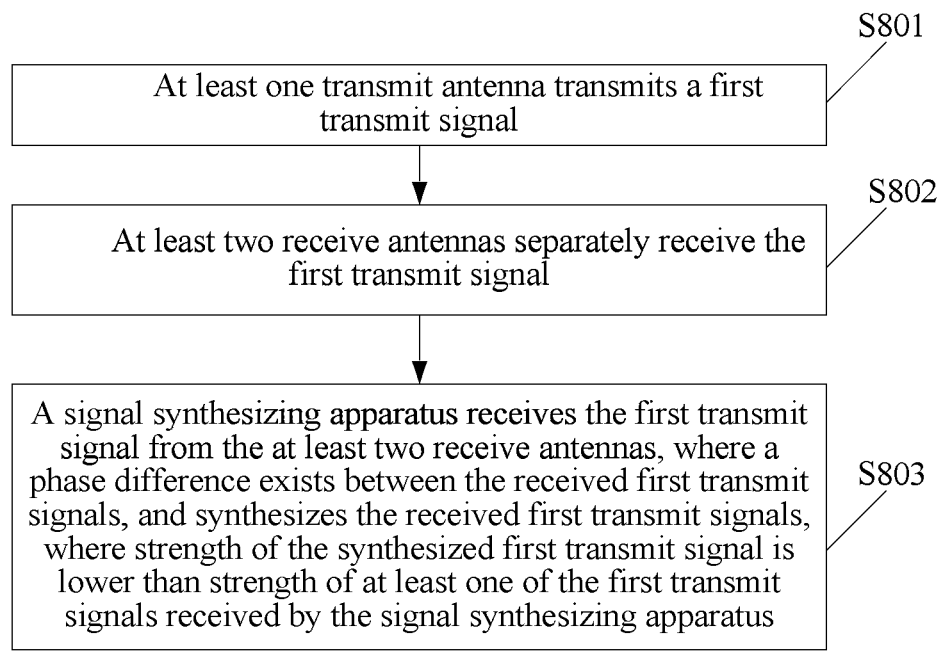
FIG. 8 is a schematic flowchart of a full-duplex communication method according to an embodiment of the present invention.

FIG. 8 is a schematic flowchart of a full-duplex communication method according to an embodiment of the present invention.

S801. At least one transmit antenna transmits a first transmit signal.

S802. At least two receive antennas separately receive the first transmit signal.

S803. A signal synthesizing apparatus receives the first transmit signal from the at least two receive antennas, where a phase difference exists between the received first transmit signals, and synthesizes the received first transmit signals, where strength of the synthesized first transmit signal is lower than strength of at least one of the first transmit signals received by the signal synthesizing apparatus.

This embodiment may further include:
further separately receiving, by the at least two receive antennas, a first receive signal when separately receiving the first transmit signal; and
receiving, by the signal synthesizing apparatus, the first receive signal from the at least two receive antennas and synthesizing the received first receive signals, where strength of the synthesized first receive signal is higher than strength of any one of the first receive signals received by the signal synthesizing apparatus.

This embodiment may further include:
adjusting, by a phase shift apparatus between the signal synthesizing apparatus and at least one receive antenna, a phase of first transmit signal from the at least one receive antenna, so that the strength of the first transmit signal after being synthesized by the signal synthesizing apparatus is reduced.

This embodiment may further include the following:
the at least one signal synthesizing apparatus specifically includes at least two signal synthesizing apparatuses, and a second signal synthesizing apparatus that is connected to the at least two signal synthesizing apparatuses receives first transmit signals from the at least two signal synthesizing apparatuses and synthesizes the received first transmit signals, where strength of the synthesized first transmit signal is lower than strength of at least one of the first transmit signals received by the second signal synthesizing apparatus.

This embodiment may further include the following:
the at least one signal synthesizing apparatus specifically includes at least two signal synthesizing apparatuses, and a second signal synthesizing apparatus that is connected to the at least two signal synthesizing apparatuses receives a first receive signal from the at least two signal synthesizing apparatuses and synthesizes the received first receive signals, where strength of the synthesized first receive signal is higher than strength of any one of the first receive signals received by the second signal synthesizing apparatus.

According to this embodiment of the present invention, at least one transmit antenna transmits a first transmit signal, at least two receive antennas separately receive the first transmit signal, and a signal synthesizing apparatus receives the first transmit signal from the at least two receive antennas, where a phase difference exists between the received first transmit signals, and synthesizes the received first transmit signals, where strength of the synthesized first transmit signal is lower than strength of at least one of the first transmit signals received by the signal synthesizing apparatus. The signal synthesizing apparatus is used to eliminate an interfering signal from the transmit antenna, and therefore there is no need to use a duplexer to eliminate the interfering signal from the transmit antenna, that is, the duplexer can be omitted.

According to the description about the embodiments, a person skilled in the art may be clearly aware that the embodiments of the present invention may be implemented by using software plus necessary universal hardware platform, and definitely may also be implemented by using hardware. Based on such an understanding, the technical solutions in the embodiments of the present invention essentially or the part contributing to the prior art may be implemented in the form of a software product. The computer software product is stored in a storage medium, and includes several instructions for instructing a computer device (which may be a personal computer, a server, a network device, or the like) to execute the method described in the embodiments of the present invention.

The foregoing disclosures are merely exemplary embodiments of the present invention, and certainly are not intended to limit the protection scope. Therefore, equivalent variations made according to the claims of the present invention shall still fall within the scope of the present invention.

What is claimed is:

1. A full-duplex communication apparatus, comprising at least one transmit antenna and at least one signal synthesizing apparatus, wherein the signal synthesizing apparatus is connected to at least two receive antennas, and
the at least one transmit antenna is configured to transmit a first transmit signal;
the at least two receive antennas are configured to separately receive the first transmit signal as received first transmit signals; and
the signal synthesizing apparatus is configured to receive the received first transmit signals from the at least two receive antennas, wherein a phase difference exists between the received first transmit signals, and synthesize the received first transmit signals, wherein a strength of a resulting synthesized first transmit signal is lower than a strength of at least one of the received first transmit signals received by the signal synthesizing apparatus, wherein:
the at least two receive antennas are further configured to separately receive a first receive signal as received first receive signals,
the signal synthesizing apparatus is further configured to receive the first receive signals from the at least two receive antennas and synthesize the received first receive signals, wherein a strength of a resulting synthesized first receive signal is higher than a strength of any one of the first receive signals received by the signal synthesizing apparatus, and
wherein the at least one signal synthesizing apparatus specifically comprises at least two signal synthesizing apparatuses, and the full-duplex communication apparatus further comprises a second signal synthesizing apparatus, wherein the second signal synthesizing apparatus is connected to the at least two signal synthesizing apparatuses, and the second signal synthesizing apparatus is configured to receive residual first transmit signals from the at least two signal synthesizing apparatus and synthesize the received residual first transmit signals, wherein strength of the synthesized first transmit signal is lower than strength of at least one of the residual first transmit signals received by the second signal synthesizing apparatus.

2. The full-duplex communication apparatus according to claim 1, wherein a phase shift apparatus is further comprised between the signal synthesizing apparatus and at least one receive antenna, and the phase shift apparatus is configured to adjust a phase of the first transmit signal from the at least one receive antenna, so that the strength of the resulting synthesized first transmit signal is reduced.

3. The full-duplex communication apparatus according to claim 1, wherein the strength of the resulting synthesized first transmit signal is zero.

4. The full-duplex communication apparatus according to claim 1, wherein the at least two receive antennas specifically comprises a first receive antenna and a second receive antenna, and the signal synthesizing apparatus is configured to receive the first transmit signal from the first receive antenna and the first transmit signal from the second receive antenna, wherein a phase difference between the first transmit signal from the first receive antenna and the first transmit signal from the second receive antenna is greater than $5\pi/6$ and less than $7\pi/6$.

5. The full-duplex communication apparatus according to claim 4, wherein the maximum wavelength of transmit signal that is supported by the at least one transmit antenna is $\lambda_1$, the supported minimum wavelength of the transmit signal is $\lambda_2$, a distance difference x exists between distances from the first receive antenna and the second receive antenna to a beam center of the first transmit signal, and $$\frac{\lambda_2}{2} \le x \le \frac{\lambda_1}{2}.$$

6. The full-duplex communication apparatus according to claim 1, wherein the second signal synthesizing apparatus is further configured to receive a first receive signal from the at least two signal synthesizing apparatuses and synthesize the received first receive signals, wherein strength of the synthesized first receive signal is higher than strength of any one of the first receive signals received by the second signal synthesizing apparatus.

7. The full-duplex communication apparatus according to claim 1, wherein a first phase shift apparatus is further comprised between the second signal synthesizing apparatus and at least one signal synthesizing apparatus, and the first phase shift apparatus is configured to perform a phase shift on the residual first transmit signals from the at least one signal synthesizing apparatus.

8. The full-duplex communication apparatus according to claim 1, wherein the transmit antenna and the receive antenna are feed antennas.

9. A full-duplex communication method, comprising:
transmitting, by at least one transmit antenna, a first transmit signal;
separately receiving, by at least two receive antennas, the first transmit signal as received first transmit signals;
receiving, by a signal synthesizing apparatus, the received first transmit signals from the at least two receive antennas, wherein a phase difference exists between the received first transmit signals, and synthesizing the received first transmit signals, wherein a strength of a resulting synthesized first transmit signal is lower than a strength of at least one of the received first transmit signals received by the signal synthesizing apparatus;
further separately receiving, by the at least two receive antennas, a first receive signal as received first receive signals when separately receiving the first transmit signal; and
receiving, by the signal synthesizing apparatus, the first receive signals from the at least two receive antennas and synthesizing the received first receive signals, wherein a strength of a resulting synthesized first receive signal is higher than a strength of any one of the first receive signals received by the signal synthesizing apparatus,
wherein the at least one signal synthesizing apparatus specifically comprises at least two signal synthesizing apparatuses, and a second signal synthesizing apparatus that is connected to the at least two signal synthesizing apparatuses receives residual first transmit signals from the at least two signal synthesizing apparatuses and synthesizes the received residual first transmit signals, wherein strength of the synthesized first transmit signal is lower than strength of at least one of the residual first transmit signals received by the second signal synthesizing apparatus.

10. The full-duplex communication method according to claim 9, further comprising:
adjusting, by a phase shift apparatus between the signal synthesizing apparatus and at least one receive antenna, a phase of first transmit signal from the at least one receive antenna, so that the strength of the resulting synthesized first transmit signal after being synthesized by the signal synthesizing apparatus is reduced.

11. The full-duplex communication method according to claim 9, wherein the second signal synthesizing apparatus further receives a first receive signal from the at least two signal synthesizing apparatuses and synthesize the received first receive signals, wherein strength of the synthesized first receive signal is higher than strength of any one of the first receive signals received by the second signal synthesizing apparatus.

* * * * *